United States Patent
Braun et al.

(10) Patent No.: US 7,933,668 B2
(45) Date of Patent: *Apr. 26, 2011

(54) WIRELESS INDUSTRIAL CONTROL USER INTERFACE WITH CONFIGURABLE SOFTWARE CAPABILITIES

(75) Inventors: Scott D. Braun, Fredonia, WI (US); Christine E. Weingarth, Germantown, WI (US); Elena N. Pokatayev, Muskego, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 954 days.

This patent is subject to a terminal disclaimer.

(21) Appl. No.: 11/259,511

(22) Filed: Oct. 26, 2005

(65) Prior Publication Data

US 2007/0093926 A1 Apr. 26, 2007

(51) Int. Cl.
*G05B 15/00* (2006.01)
*G05B 11/01* (2006.01)

(52) U.S. Cl. .............................. 700/83; 700/17; 700/87

(58) Field of Classification Search ................... 700/83, 700/17, 18, 79, 86, 87; 455/419, 420, 557
See application file for complete search history.

(56) References Cited

U.S. PATENT DOCUMENTS

| | | | |
|---|---|---|---|
| 6,041,287 A * | 3/2000 | Dister et al. | 702/182 |
| 6,275,585 B1 * | 8/2001 | Ablay et al. | 380/2 |
| 6,984,950 B2 | 1/2006 | Jonsson et al. | |
| 7,092,771 B2 | 8/2006 | Retlich et al. | |
| 7,493,088 B2 * | 2/2009 | Levy et al. | 455/67.11 |
| 2002/0151993 A1 * | 10/2002 | Olesen et al. | 700/86 |
| 2004/0098148 A1 | 5/2004 | Retlich et al. | |
| 2004/0210348 A1 | 10/2004 | Imhof et al. | |
| 2005/0278785 A1 * | 12/2005 | Lieberman | 726/24 |
| 2006/0026672 A1 * | 2/2006 | Braun | 726/9 |
| 2006/0129336 A1 | 6/2006 | Pretlove et al. | |
| 2007/0055829 A1 * | 3/2007 | Rudelic | 711/149 |
| 2007/0093921 A1 * | 4/2007 | Braun et al. | 700/83 |

FOREIGN PATENT DOCUMENTS

| | | | |
|---|---|---|---|
| EP | 1519338 | * | 3/2005 |
| WO | WO 2004/114630 | * | 12/2004 |

* cited by examiner

*Primary Examiner* — Albert Decady
*Assistant Examiner* — Steven R Garland
(74) *Attorney, Agent, or Firm* — Quarles & Brady LLP; William R. Walbrun; John M. Miller

(57) ABSTRACT

A user interface operable to connect to a device within an industrial control system includes a memory and a processing unit. The memory is operable to store a plurality of software applications for interfacing with the device and a configuration mask including access rights for at least a subset of the software applications. The processing unit is operable to establish a first connection with the device and disable selected software applications based on the configuration mask.

18 Claims, 12 Drawing Sheets

US 7,933,668 B2

WIRELESS INDUSTRIAL CONTROL USER INTERFACE WITH CONFIGURABLE SOFTWARE CAPABILITIES

CROSS-REFERENCE TO RELATED APPLICATIONS

Not Applicable.

STATEMENT REGARDING FEDERALLY SPONSORED RESEARCH OR DEVELOPMENT

Not Applicable

BACKGROUND OF THE INVENTION

The present invention relates generally to industrial control systems, and, more particularly, to a wireless industrial control user interface with configurable software capabilities.

Industrial controllers are special purpose computers used for controlling industrial processes or manufacturing equipment. Under the direction of a stored program, the industrial controller examines a series of inputs reflecting the status of the controlled process and changes outputs affecting the control of the process. The inputs and outputs may be binary (i.e., "on" or "off") or analog taking on a continuous range of values. The binary inputs and outputs may be represented by single bits of data, the analog inputs and outputs may be represented by multiple bit data words.

Exemplary applications for industrial control systems include material handling, robotics, airport baggage handling, water and wastewater treatment, cement production, semiconductor fabrication, electric power, entertainment, food processing, mining, beverage and packaging operations, ski lift operations, forest products processing, life sciences, logistic processes, fibers and textiles processing, metal forming, automotive, petroleum and chemical processing, plastics processing, automated transportation, health care, agriculture, postal and shipping, and other manufacturing processes, to name but a few examples.

The various components of an industrial controller are often spatially distributed about a factory or manufacturing facility to be interconnected by one or more communication networks. These communication networks are characterized by being highly reliable and by delivering data with a minimal and well defined delay, as is required for real-time control. A number of different communication networks are commonly used in the industrial controller art including but not limited to: ControlNet™; DeviceNet™ and Ethernet/IP™ whose specifications are published and whose protocols are used broadly by a number of manufacturers and suppliers, including Rockwell Automation Inc. of Milwaukee, Wis. These communication networks differ from one another in physical aspects, for example, the type of media (e.g., co-axial cable, twisted pair, light fiber, etc.); the protocols of its operation, (e.g., Baud rate, number of channels, word transmission size, use of connected messaging, etc.) and how the data is formatted and how it is collected into standard messages.

At the site of an industrial control system, it may be possible to gain access to entities within the industrial control system by using a user interface associated with one or more of the automation devices that forms the industrial control system. For example, an individual may use a user interface directly coupled to a motor drive to gain access to the motor drive. Alternatively, standard interfaces are sometimes provided that allow access to be gained by connecting a laptop or other computer to a communication network that connects portions of the industrial control system.

Connecting a user interface to the communication network that allows access to multiple entities within the industrial control system may give rise to security issues and identification accuracy issues. Typically, a device on the communication network, such as an Ethernet network, has access to and can be accessed by any other device on the network. One or more devices on the communication network may have direct or indirect connections with the Internet. As such, an outside entity may try to compromise the user interface, and potentially the industrial control system.

Also, because the user interface may be used to access multiples drives, controllers, I/O modules, etc. within the industrial control network, it may be possible for a user to inadvertently connect to the wrong entity. Previously, this vulnerability has been addressed by requiring proximity to the controlled device (i.e., by requiring a hardwired connection). As wireless networking systems proliferate, it is no longer workable to require hardwired connections to guard against such identification errors.

In the case where a portable user interface is used, it is useful to employ common hardware and software for ease of configuration management. However, from a security and reliability standpoint, it would not be desirable to provide all users of such a portable interface equal access to all functionalities of the industrial control system. For example, an operator may find it useful to access control (e.g., start, stop) and status information regarding a particular motor drive, while a maintenance technician or engineer may need to access the motor drive to update its firmware or change its configuration. If all users were provided a common portable user interface with common functionality, users may intentionally or inadvertently access functionalities for which they lack the requisite training or authority.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

BRIEF SUMMARY OF THE INVENTION

One aspect of the present invention is seen in an industrial control system including a motor drive, a wireless interface module, and a wireless user interface. The motor drive has at least a first port. The wireless interface module is coupled to the first port of the motor drive. The wireless user interface is operable to connect to the wireless interface module and establish a first connection through the wireless interface module to access the motor drive. The wireless user interface is further operable to store a plurality of software applications for interfacing with the motor drive, store a configuration mask including access rights for at least a subset of the software applications, and disable selected software applications based on the configuration mask.

Another aspect of the present invention is seen in a user interface operable to connect to a device within an industrial control system. The user interface includes a memory and a processing unit. The memory is operable to store a plurality of software applications for interfacing with the device and a configuration mask including access rights for at least a subset of the software applications. The processing unit is operable to establish a first connection with the device and disable selected software applications based on the configuration mask.

These and other objects, advantages and aspects of the invention will become apparent from the following description. The particular objects and advantages described herein may apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and.

Figure 1:
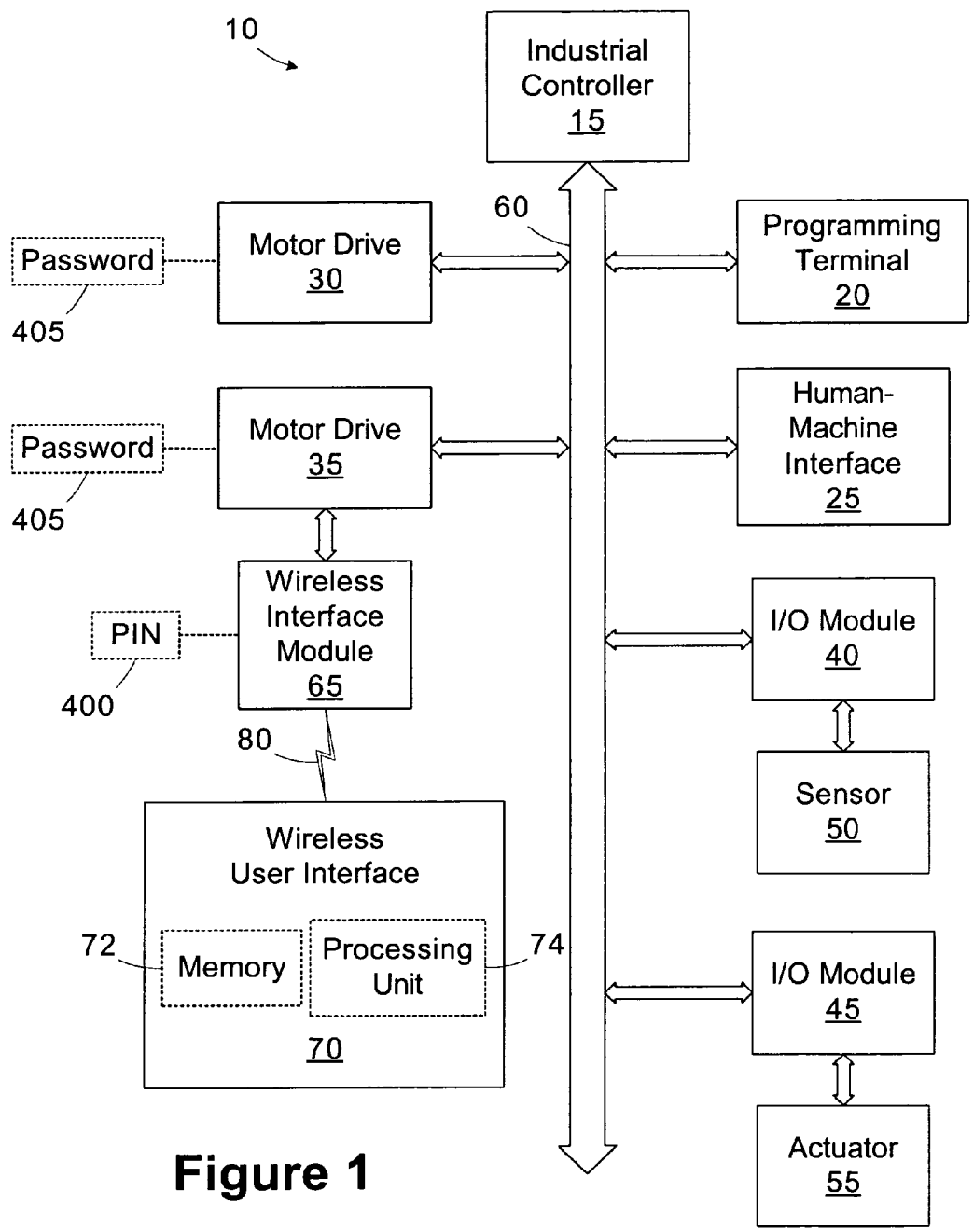
FIG. 1 is a simplified block diagram of an industrial control system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Referring now to the drawings wherein like reference numbers correspond to similar components throughout the several views and, specifically, referring to FIG. 1, the present invention shall be described in the context of an industrial control system 10. Generally, the industrial control system 10 includes an industrial controller 15 (e.g., programmable logic controller (PLC)), a programming terminal 20, a human-machine interface (HMI) 25, motor drives 30, 35, I/O modules 40, 45, a sensor 50, and an actuator 55, all coupled to communicate over a communication network 60.

The programming terminal 20 allows the configuring, modifying, debugging and maintaining of the industrial control system 10. For instance, the programming terminal 20 may communicate with the industrial controller 15 to modify aspects of the controller's operation, such as the control program stored in its memory and executed by its processing unit. The HMI 25 provides an operator interface for operating the industrial control system 10 to perform an automated industrial process.

The I/O modules 40, 45 provide interfaces to the sensor 50 and actuator 55 associated with a controlled process. Although only one sensor 50 and actuator 55 are shown, many may be present. In the illustrated embodiment, the motor drives 30, 35 are also a type of actuator, but do not require an intermediary I/O module 40, 45. The sensor 50 can sense an item such as temperature, pressure, flow rate of a fluid, torque, electrical current, etc., associated with the controlled process. The actuator 55 may control various items associated with valves, robotic systems, fans, beaters, pumps, and the like.

At the industrial controller 15, the input signals (e.g., from the I/O module 40) may be processed under a control program and further signals sent as output signals (e.g., to the motor drives 30, 35 or actuator 55). The particular process being controlled, and specific inputs and outputs are not material to the present invention. The I/O modules 40, 45 may be integrated with the industrial controller 15 or remote from the industrial controller 15. In one embodiment, the industrial control system 10 may be implemented using Logix™ components offered by Rockwell Automation, Inc. of Milwaukee, Wis. The communication network 60 may be implemented using various topologies, and may include discrete wiring or a digital network which may also include repeaters, routers, bridges, and gateways. Suitable communication media are the DeviceNet™, EtherNet/IP™, or ControlNet™ networks also offered by Rockwell Automation.

The motor drive 35 is equipped with a wireless interface module 65 that allows a wireless user interface 70 to establish a wireless connection 80 with the motor drive 35, thereby allowing access to the industrial control system 10. Generally, the wireless interface module 65 and wireless user interface 70 communicate messages using a commercial wireless protocol, such as Bluetooth®, as the network and/or transport protocol. Of course, other protocols may be used.

In general, the wireless user interface 70 includes a memory 72 and a processing unit 74 (e.g., microprocessor) operable to execute software instructions stored in the memory 72. Exemplary wireless user interfaces include a personal data assistant (PDA), notebook computer, tablet computer, desktop computer, etc. For purposes of the following illustration, it is assumed that the wireless user interface 70 is a PDA.

The messages that are encapsulated by the higher level protocols are formatted using a different protocol. For example, a manufacturer may define proprietary message protocols such that messages may be formatted in a manner that only devices also configured to process the proprietary message protocol may decode the messages and take the appropriate actions defined in the encapsulated message.

DPI™, DSI™, and SCANport™ are proprietary message protocols used by Rockwell Automation, Inc.

Figure 2:
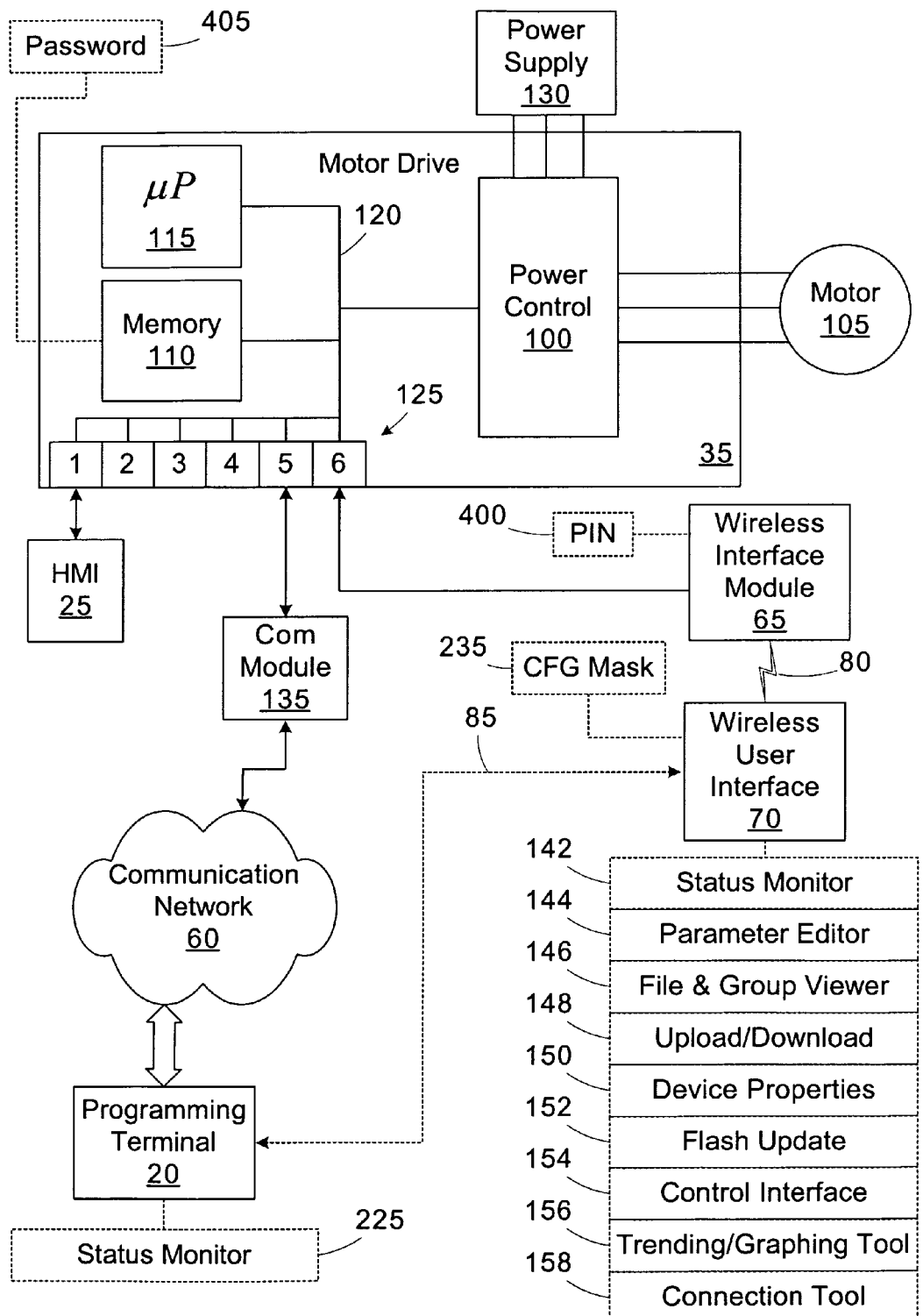
FIG. 2 is a simplified diagram of a motor drive interfacing with a wireless user interface of FIGS. 1 and 2.

Turning now to FIG. 2, a simplified block diagram of the motor drive 35 interfacing with the wireless user interface 70 is provided. Prior to be used in the field, the wireless user interface 70 may be configured using the programming terminal 20 or other computer workstation, as represented by the connection 85, which may be a wireless connection or a wired connection through an interface cable or docking cradle. The connection 85 is shown in phantom to distinguish it from the connection 80 established between the wireless interface module 65 and the wireless user interface 70 when it is being used in the field. The configuration of the wireless user interface 70 is described in greater detail below.

As seen in FIG. 2, the motor drive 35 includes power control electronics 100 for generating voltage controlled power to an associated motor 105, a memory 110 for storing program instructions embodied in a control application, a microprocessor 115 for executing the control application, a local bus 120 for communication between the microprocessor 115, memory 110, and a plurality of interface ports 125 (i.e., numbered 1-6). The ports 125 may have various topologies, depending on the particular implementation. For example, the ports 125 may be general serial ports, network interfaces, HMI interfaces, etc. The ports 125 may be expandable.

A power supply 130 typically provides a three phase AC voltage received from a utility grid to the motor drive 35. The nominal line voltage of the power supply 130 may vary depending on the particular implementation. The motor drive 35 receives 3-phase power from the power supply 130 and converts the AC power to DC. As is well known in the art, the motor drive 35 employs a plurality of switching devices (e.g., BJT's, etc.) such that by opening and closing specific combinations of the switches, positive and negative DC voltage pulses are generated on supply lines provided to the motor 105. By opening and closing the inverter switches in specific sequences, AC voltages having controllable amplitudes and frequencies can be generated on each of the supply lines. Each of the lines is linked to a separate one of three-phase windings of the motor 105. By providing known sequences of AC voltages across the motor windings, varying currents are caused therein which induce a rotating magnetic field within a motor stator core. A motor rotor (not illustrated) which is linked to a motor shaft resides within the motor core. The rotor includes either bars or windings or both and, when the changing and rotating magnetic field within the stator core intersects the rotor, currents are induced within the rotor and the rotor currents in turn cause a rotor magnetic field within the stator core. The rotor field is attracted by the rotating stator field and hence the rotor rotates within the stator core. A load (not shown) is attached to the rotor and therefore, when the rotor rotates, the load also tends to rotate in the same direction.

The motor drive 35 may be controlled and or configured via interfacing devices through the ports 125 using local or remote connections. In the example configuration of FIG. 2, the HMI 25 is coupled to a local port (i.e., Port 1) of the drive 35, as opposed to being disposed on the communication network 60 as shown in FIG. 1. Port 5 is coupled to a communication module 135 (e.g., Ethernet network card) that allows the motor drive 35 to access the communication network 60. Devices such as the programming terminal 20 may access the motor drive 35 through the communication module 135. The wireless interface module 65 is coupled to port 6 of the motor drive 35.

In the illustrated embodiment, port 6 communicates using a proprietary message protocol, such as DPI™ or DSI™, to communicate with the motor drive 35. Hence, the wireless interface module 65 strips the communication protocol formatting used to communicate over the connection 80 (e.g., Bluetooth®) and extracts the message formatted in the proprietary message protocol. The wireless interface module 65 may also route messages from the wireless user interface 70 to other entities in the industrial control system 10, such as other motor drives, through the local bus 120 and over port 5 to the communication network 60. The communication module 135 encapsulates messages in the proprietary message protocol in accordance with the communication protocol used over the communication network 60 and routes the messages to the appropriate target device. Accordingly, the wireless user interface 70 may communicate with devices on the communication network 60 that can respond to the proprietary message protocol.

For purposes of the following illustration, it is assumed that the wireless interface module 65 and wireless user interface 70 communicate using Bluetooth®. Bluetooth® employs a serial, point-to-point connection topology. The wireless user interface 70 acts as a master device and the wireless interface module 65 acts a slave device. In accordance with the Bluetooth® protocol, once the connection 80 is established between the master device and the slave device, no other master device can make a connection. Hence, the wireless user interface 70 establishes an exclusive connection with the wireless interface module 65 and the associated drive 35. A different wireless user interface (not shown) could not make a connection in parallel with the wireless user interface 70, and in fact, once the connection 80 is established a different wireless user interface would not see the motor drive 35 as being available for connection within the connection manager.

The wireless user interface 70 may be provided with various software applications for performing various tasks on the motor drive 35, its peripherals, or other entities in the industrial control system 10. Exemplary applications shown in FIG. 2 include a status monitor 142, a parameter list viewer 144, a file and group viewer 146, an upload/download tool 148, a device properties viewer 150, a flash update tool 152, a control interface 154, a trending/graphing tool 156, and a connection tool 158. As will be described in greater detail below, with reference to FIG. 5, the wireless user interface 70 may be configured to selectively enable one or more of these applications 142-158 to allow it to be tailored for different types of users.

Figure 3:
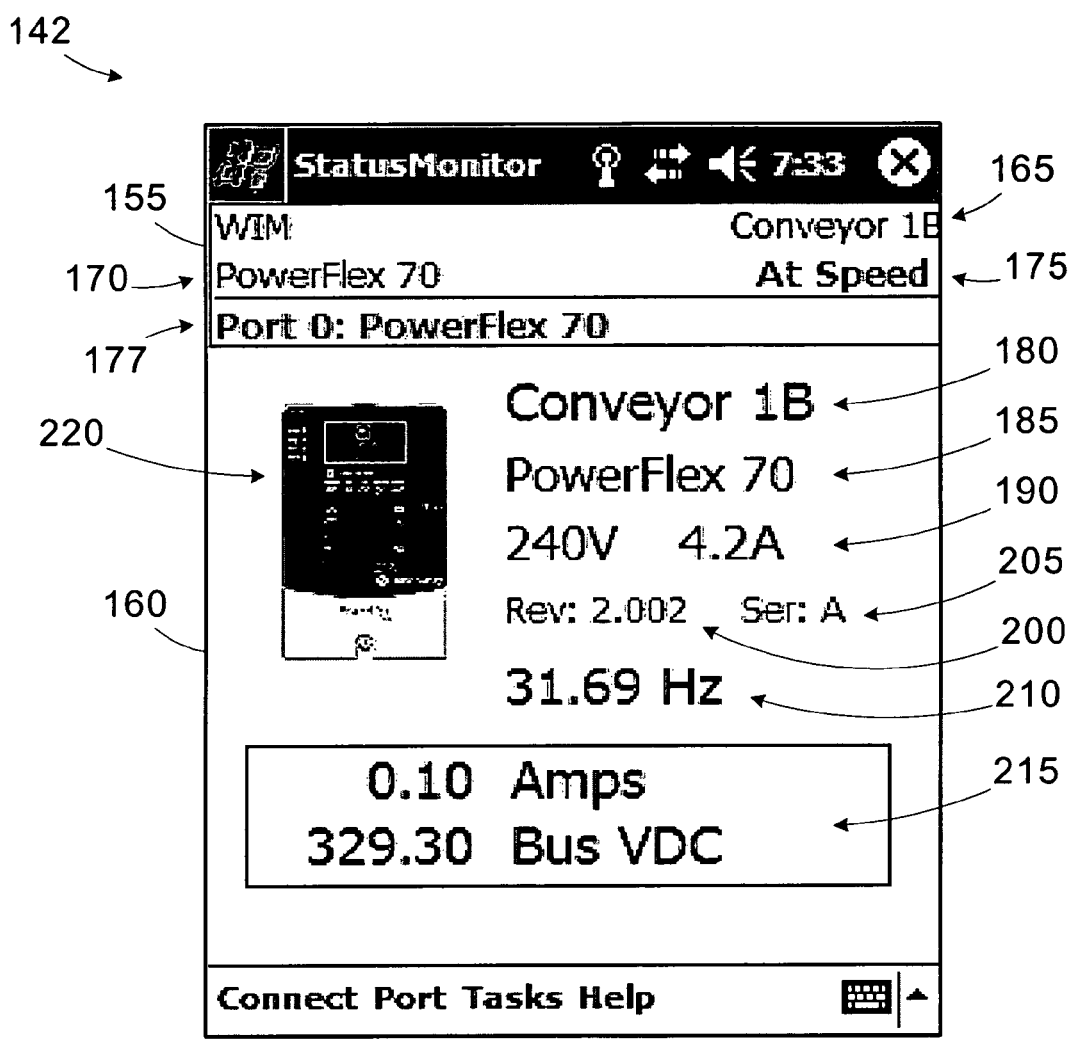
FIGS. 3 and 4 are diagrams of a status monitor implemented by the wireless user interface of FIGS. 1 and 2.

Referring now to FIG. 3, a diagram illustrating a graphical user interface implemented by the status monitor 142 is shown. It is assumed that the connection 80 between the wireless interface module 65 and wireless user interface 70 has been established and that the user has selected the motor drive 35 as the device within the industrial control system 10 to access. The graphical user interface of the status monitor 142 defines a host frame 155 and a device frame 160. Generally, the host frame 155 displays information associate with the host device, while the device frame 160 displays data associated with the device itself. In the case where the device is the motor drive 35, the drive is both the host and the device. In the case where the device is a peripheral of the motor drive 35 (i.e., illustrated in FIG. 4), the motor drive 35 is the host, and the peripheral is the device.

Displayed within the host frame 155 are a host name field 165 indicating the name of the host, a host type field 170 indicating the type of the host device (e.g., model designation), a host state field 175 indicating the current state of the host (e.g., in this case "At Speed"), and a port field 177 indicating the port 125 with which the device is associated. In the current example, the device is the host device, so the port designation is Port 0.

The device frame 160 includes a device name field 180, a device type field 185, a device rating field 190, a firmware revision field 200, a hardware version field 205, a feedback field 210, one or more user-defined fields 215, and a device image 220.

The particular data displayed in each field depends on the device and may vary depending on user selections. In the illustrated example, the device rating field 190 shows the voltage and current ratings for the motor drive. The feedback field 210 for the motor drive 35 displays the current speed of the drive in Hz. The user-defined fields 215 display items selected by the user for display. A particular drive may have a parameter list including multiple variables associated with the operation of the drive. The user may select from those parameters and define labels for the selected parameters to be displayed within the user-defined fields 215. In this example the user-defined fields 215 display current and DC bus voltage. Of course other parameters and labels may be defined.

The device image 220 shows a graphical representation of the connected device (e.g., the motor drive 35). The image displayed may be an image of the actual device or an image representative of the device. For example, the motor drive 35 in the illustrated example is a PowerFlex® 70 offered by Rockwell Automation, Inc. In one embodiment, the same picture may be used for all PowerFlex® 70 drives. Using representative images, as opposed to actual images, reduces the size of the image library maintained by the wireless user interface 70. Although pictorial images are illustrated, in some embodiments, the image displayed may include a line drawing or other rendering of the device or device type.

Figure 4:
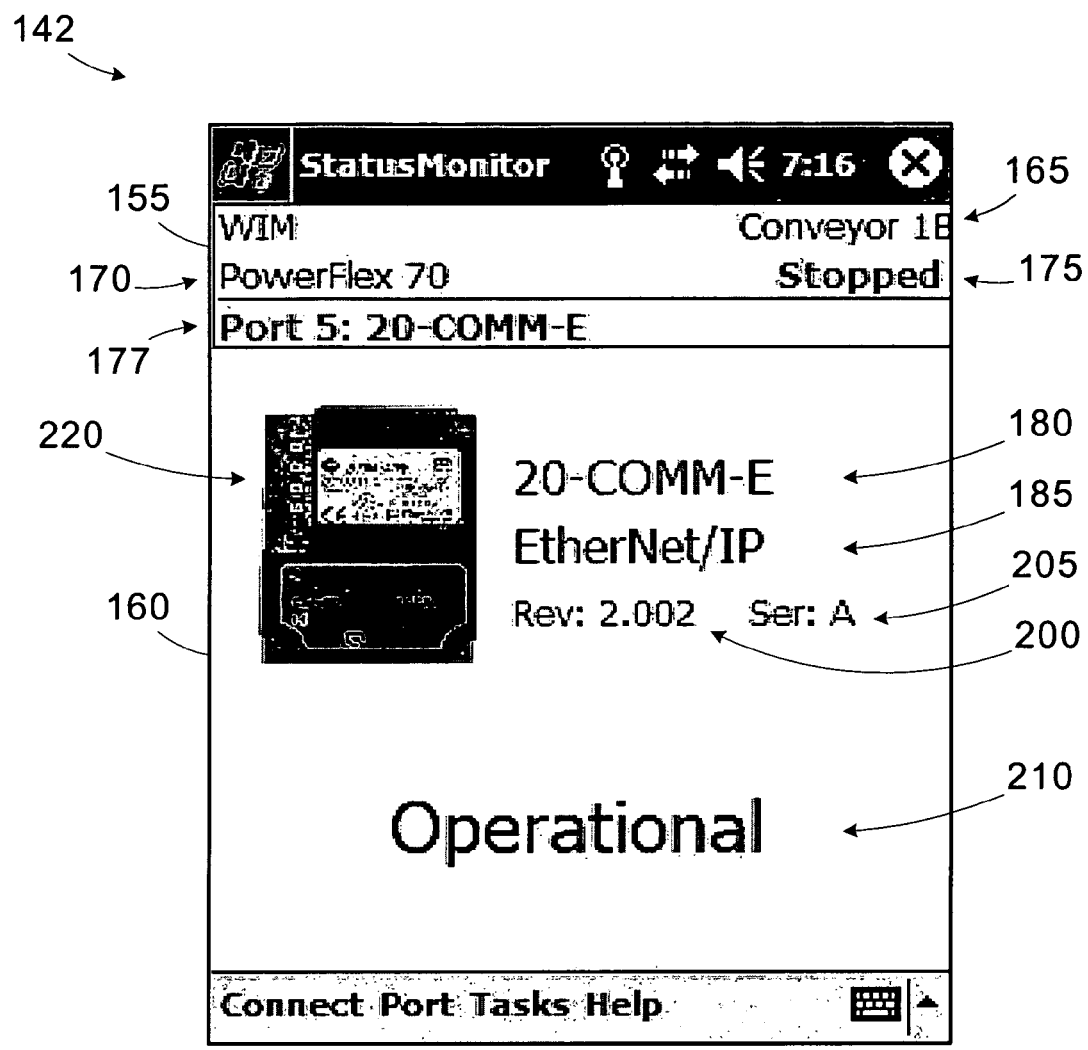

Turning to FIG. 4, the configuration of the graphical user interface for a connection established between the wireless user interface 70 and a peripheral, in this case the communication module 135. The host frame 155 displays information associated with the motor drive 35, and the device frame 160 displays information associated with the communication module 135. Note that the port field 177 indicates the communication module 135 is associated with port 5 of the motor drive 35. The host state field 175 indicates that the motor drive 35 is in a "Stopped" state, and the feedback field 210 indicates the status of the communication module 135 is "Operational." The device rating field 190 is not applicable to the communication module 135, and no user-defined fields 215 are defined for the communication module 135, so these fields 190, 215 are omitted.

Showing the device image 220 in conjunction with the device name 180 helps the user to verify that the device to which the connection is made is actually the intended target. This association reduces the likelihood of identification errors. Because the wireless user interface 70 employs a wireless connection, and may not be located proximate the motor drive 35 when the connection 80 is established, this added identification surety enhances the reliability of the industrial control system 10.

Figure 5:
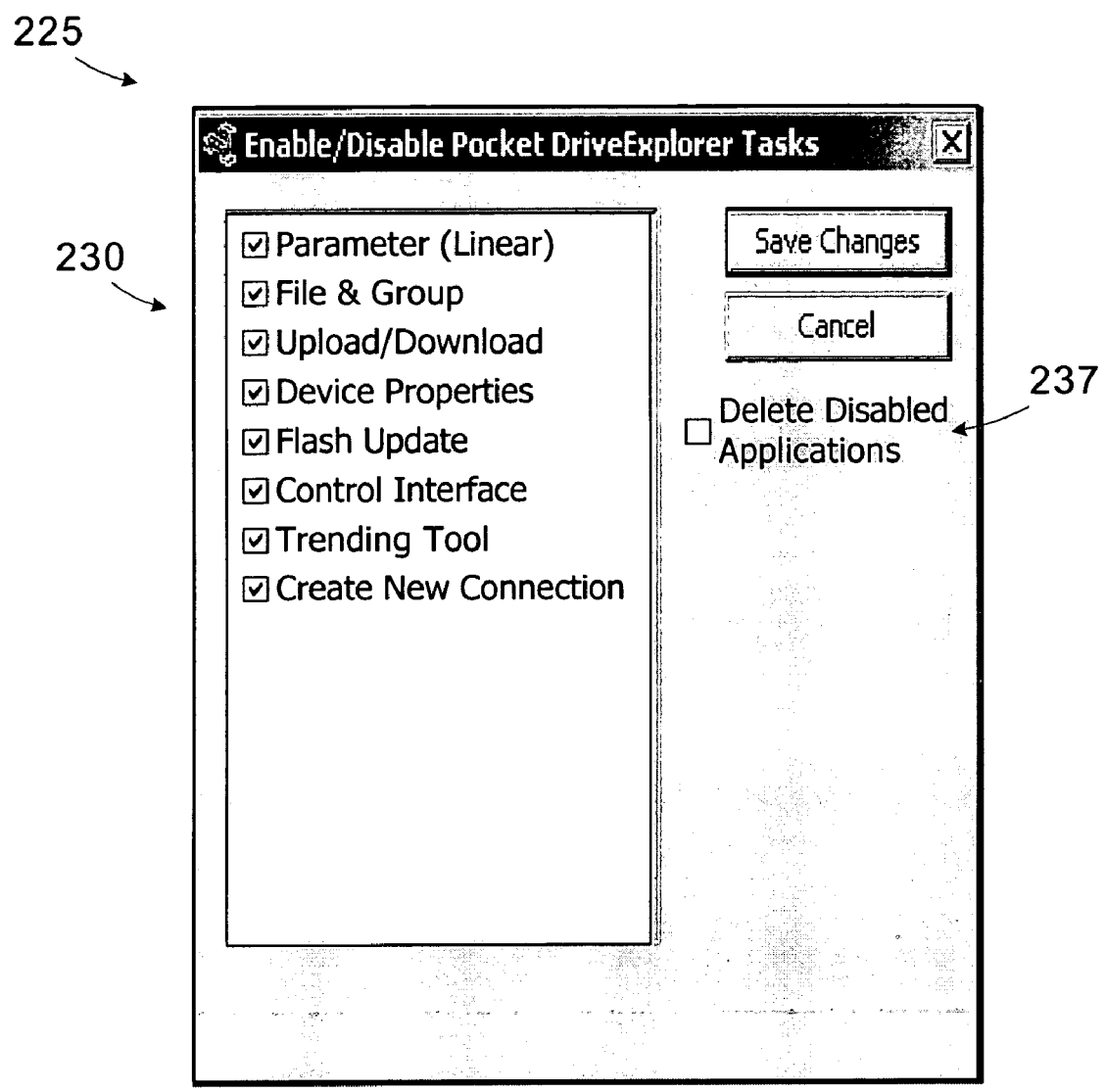
FIG. 5 is diagram of a configuration tool used for configuring the wireless user interface of FIGS. 1 and 2.

Turning now to FIGS. 2 and 5, the programming terminal 20 executes a configuration tool 225 for configuring the wireless user interface 70 prior to its use in the field. Generally, the configuration tool 225 controls which of the software applications 142-158 the wireless user interface 70 is allowed to execute.

FIG. 5 illustrates an exemplary screen shot of the configuration tool 225. The configuration tool 225 displays a plurality of checkboxes 230, each corresponding to one of the software applications 142-158 shown in FIG. 2. By default, the status monitor 142 is always available, so a checkbox 230 is not provided to allow it to be disabled. By selecting various combinations of checkboxes, the wireless user interface 70 can be tailored for different users. For example, a supervising engineer or manager may execute the configuration tool 225 to make the selections for a particular user or class of users. The configuration tool 225 stores a configuration mask 235 (shown in FIG. 2) on the wireless user interface 70 that defines the applications for which the user of the wireless user interface 70 is authorized to use. In one embodiment, all of the applications may be left on the wireless user interface 70 so that is can be easily reconfigured for a different user by changing the configuration mask 235. In another embodiment, the configuration tool 225 may delete the non-enabled applications from the wireless user interface 70. If the configuration mask 235 is later changed, the configuration tool 225 may reload the restored applications. The user may select the particular option using the checkbox 237 illustrated in FIG. 5.

The following discussion illustrates exemplary applications that may be employed by the wireless user interface 70 as controlled by the configuration mask 235. Of course, other additional applications or applications that differ in content and format from the illustrated applications may be used.

Figure 6:
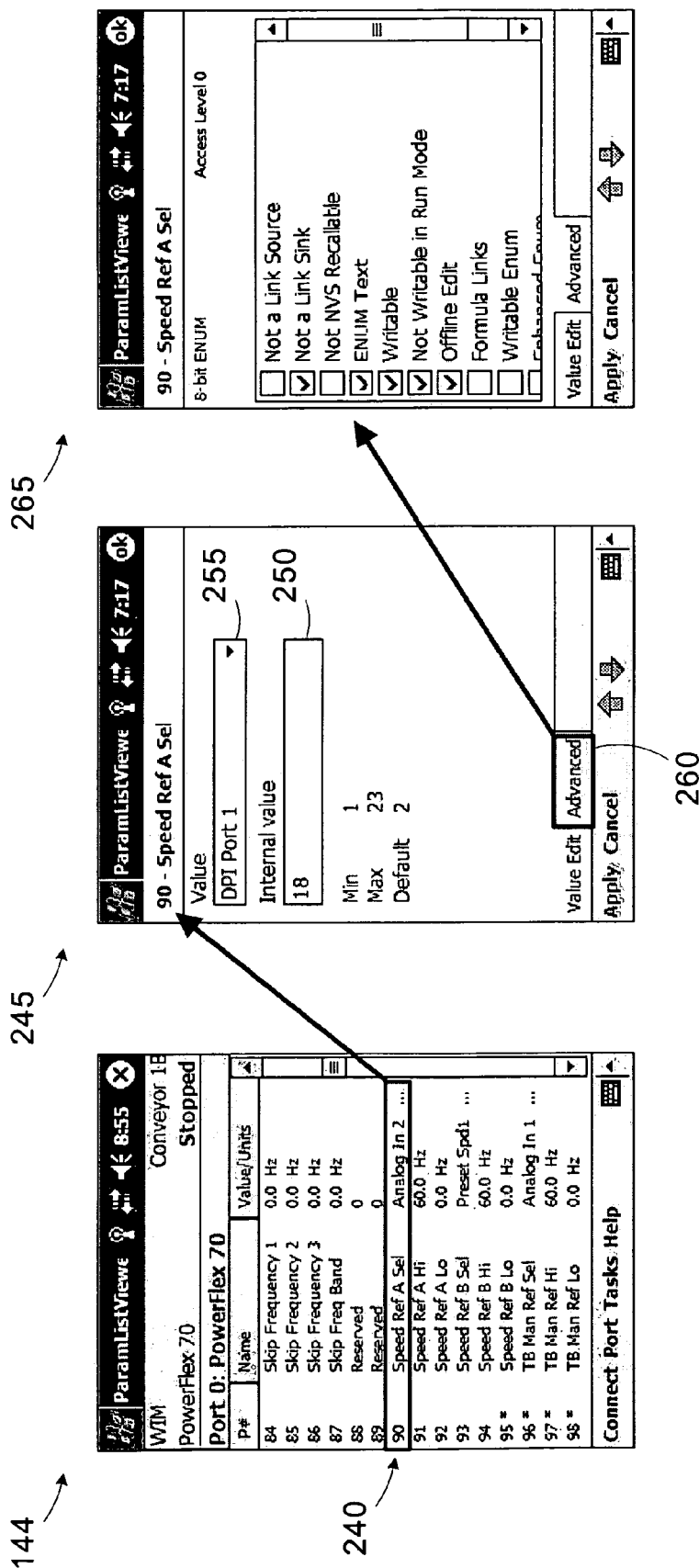
FIGS. 6-13 are diagrams illustrating graphical user interfaces generated by software applications implemented by the wireless user interface of FIGS. 1 and 2.

As seen in the exemplary screen shot shown in FIG. 6, the parameter list viewer 144 allows a user to view a linear list of all the parameters maintained by the device (e.g., the motor drive 35). FIG. 6 shows example parameters for a motor drive 35. Of course, depending on the particular implementation, the number and content of the parameters may vary by device. The parameter list viewer 144 provides the user with a simple list of all the parameters maintained by the device arranged in numerical order. The user may select a particular parameter 240, and the parameter list viewer 144 will display a parameter detail screen 245 that allows the user to view and/or change the parameter 240. The parameter list viewer 144 shows the parameter value 250 and an enumeration field 255 showing a text string associated with the parameter value 250. For example, the value 18 for the "Speed Ref A Sel" parameter corresponds to "DPI Port 1." When the speed reference selection source is shown by the drive 35 (e.g., on the HMI 25), the enumeration field 255 value of "DPI Port 1" may be displayed rather than the internal parameter value 250.

Still referring to FIG. 6, the user may also select an advanced tab 260 to bring up an attribute screen 265 that displays various attributes of the parameter 240, such as whether the parameter is writeable in run mode or whether can be edited offline. The parameter lists displayed by the parameter list viewer 144 may be stored to a file on the wireless user interface 70 for later analysis or printing. The particular attributes may vary depending on the particular implementation, and the examples illustrated are meant to be illustrative rather than limiting.

Figure 7:
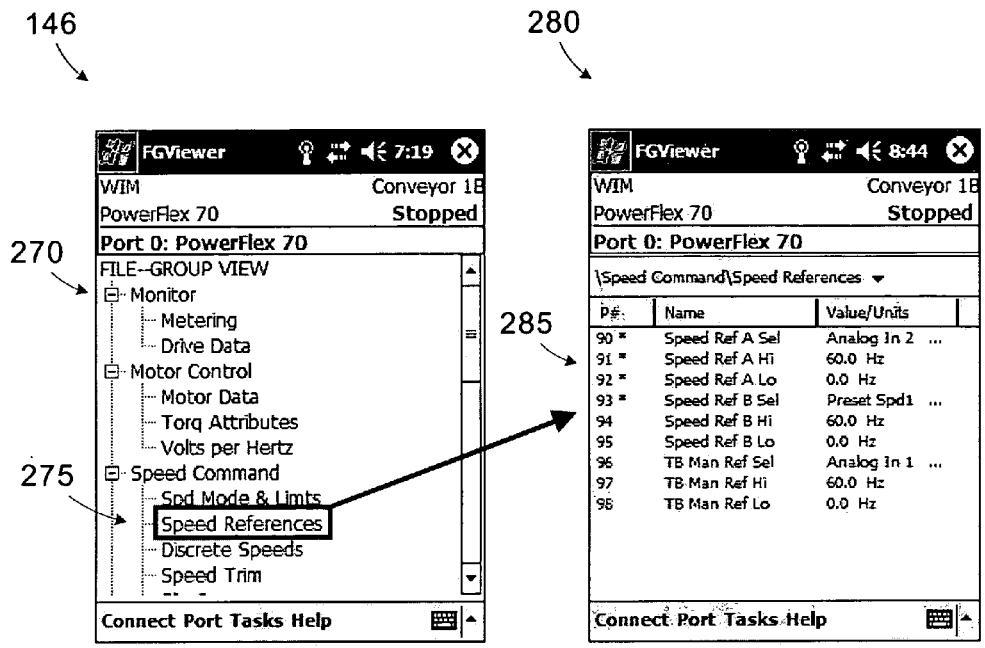

Referring now to FIG. 7, the file and group viewer 146 provides a structured view of the parameters. The structure is typically defined by the device (e.g., the motor drive 35). The wireless user interface 70 imports that defined structure and displays the parameters accordingly. For example, the motor drive 35 may define file categories 270, which broadly define categories of parameters (e.g., Monitor, Motor Control, Speed Command), and a group 275, which defines groups of parameters within the file category 270 (e.g., Speed Mode and Limits, Speed References, Discrete Speeds, Speed Trim, etc.). The user may select a particular file category 270, such as the "Speed Command" category, and a particular group 275, such as the "Speed References" group. The file and group viewer 146 then opens an element display 280 which displays the parameters 285 included in the selected group 275.

Figure 8:
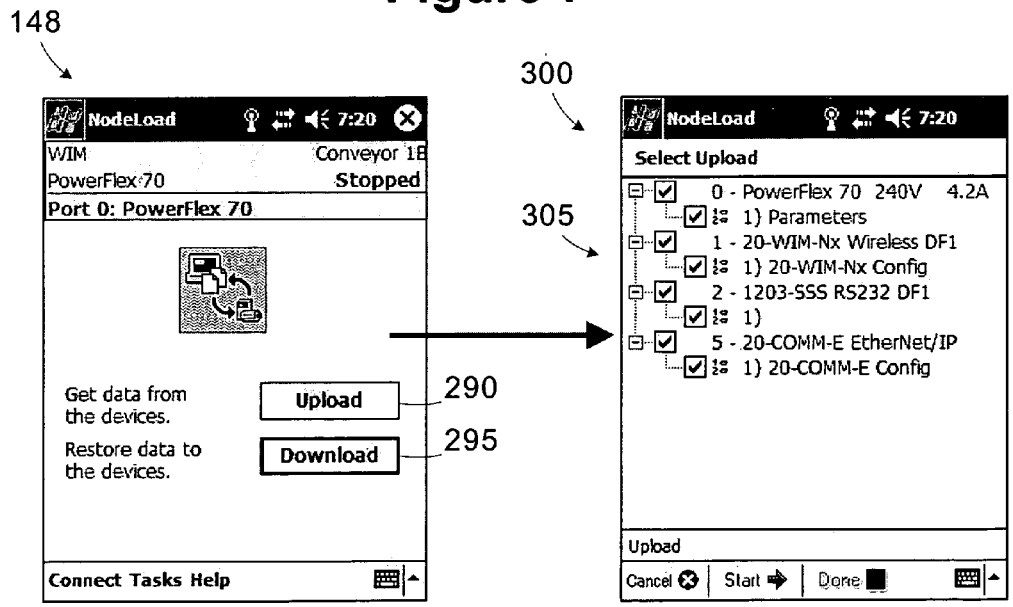

FIG. 8 illustrates a screen shot of the upload/download tool 148. The upload/download tool 148 allows the user to upload or download the configuration of the device and/or its associated peripherals. For example, all of the configuration parameters for the motor drive 35 and its peripherals, such as the communication module 135 may be transferred. By way of illustration, the configuration data may include the parameters, defined links, process display settings, stored parameter sets, etc.) The user may select an upload button 290 to get configuration data from the devices and store the configuration data in a file, or a download button 295 to replace the configuration data in the devices with data from a previously stored configuration file. In the example illustrated in FIG. 8, responsive to the user selecting the upload button 290, the upload/download tool 148 displays an upload panel 300 including a device list 305 that allows the user to specify which devices associated with the host are to be uploaded.

Figure 9:
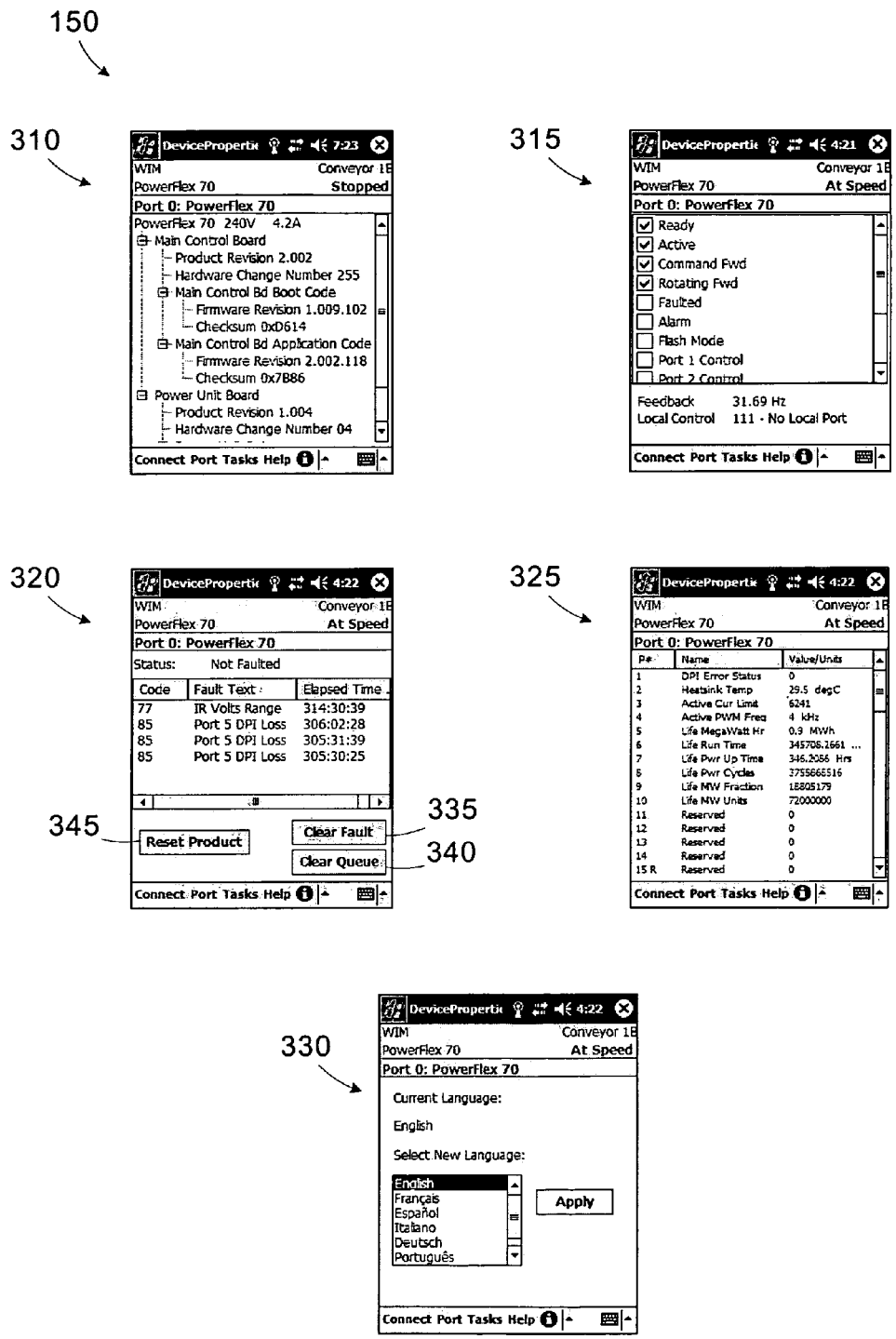

Referring now to FIG. 9, screenshots associated with the device properties viewer 150 are shown. The device properties viewer 150 displays various screens relating the properties of the device, such as a details panel 310, a status/feedback panel 315, a fault panel 320, a diagnostics panel 325, and a language panel 330. The details panel 310 shows properties of the device, such as product revision, firmware revision and checksum, hardware revision, etc. The status/feedback panel 315 shows the state of the device (e.g., ready, active, command forward, running forward, faulted, alarm, etc.) Depending on the particular implementation, the user may or may not change the state of the device by selecting one of the state checkboxes in the status/feedback panel 315. The fault panel 320 shows a fault log associate with the device and allows the user to clear a particular fault by selecting a clear fault button 335, clear the entire queue of faults by selecting a clear queue button 340, or reset the device by selecting a reset device button 345. The diagnostics panel 325 provides the user with diagnostic information received by the device, such as run time, power cycles, etc. for a motor drive 35 or parity errors for a communication module 135. This diagnostics information may be used to diagnose a fault condition or operational problem with the device. The language panel 330 allows the user to configure the language settings of the device.

Figure 10:
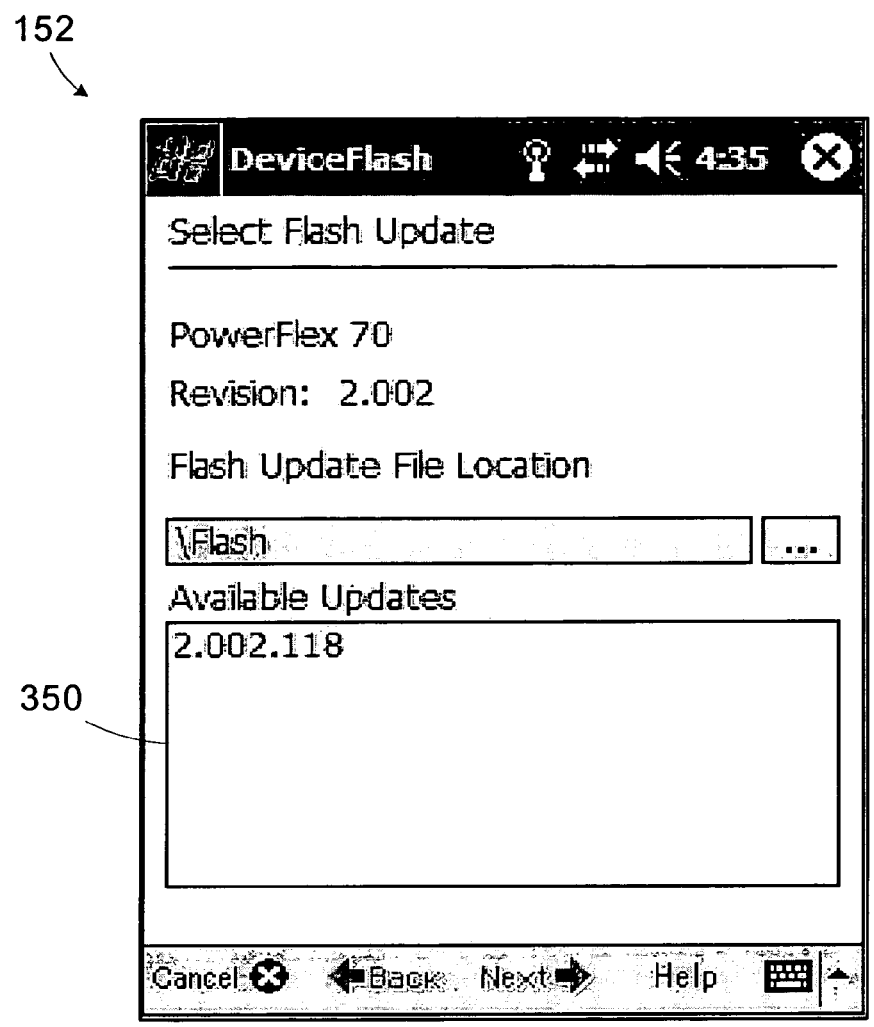

Turning to FIG. 10, the flash update tool 152 allows the user to upgrade the firmware of the device using a previously stored flash update data file. For example, when the wireless user interface 70 is configured by the programming terminal 20 over the connection 85 illustrated in FIG. 2, one or more flash update files may be transferred to the wireless user interface 70 for use in the field. When the user executes the flash update tool 152, the wireless user interface 70 determines if any of the stored flash update files are applicable to the device to which the wireless user interface 70 is connected and displays the updates in an available update field 350. Selecting one of the available updates will cause the flash update tool 152 to update the firmware stored in the device.

Figure 11:
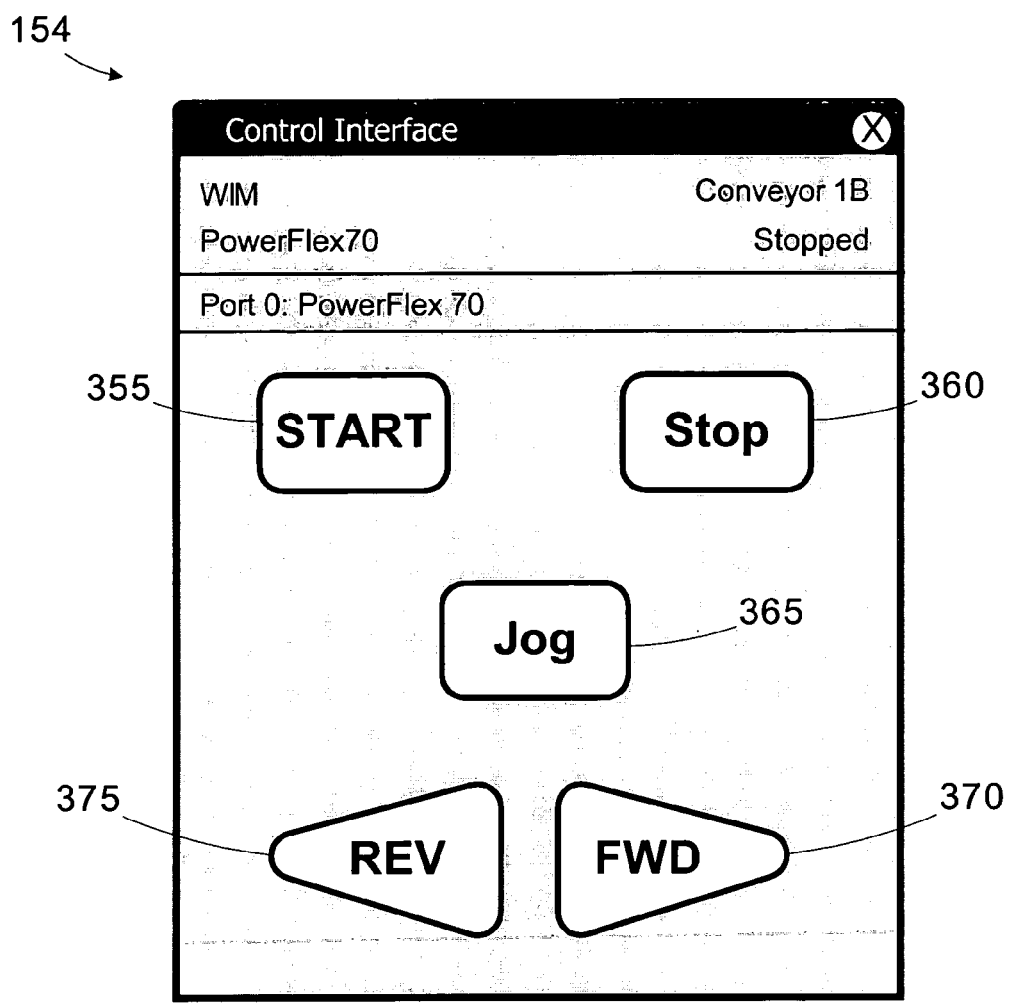

As seen in FIG. 11, the control interface 154 allows the user to control the attached device, similar to the control functionality conventionally provided by the HMI 25. The illustrative control interface 154 includes a START button 355, a STOP button 360, a JOG button 365, a FORWARD button 370, and a REVERSE button 375. By selecting the appropriate buttons, the user may control the device (e.g., the motor drive 35). The particular arrangement of the control interface 154 is provided for illustrative purposes only. The layout of the control interface 154 and the command buttons displayed thereon may vary widely depending on user preference, type of device, etc.

Figure 12:
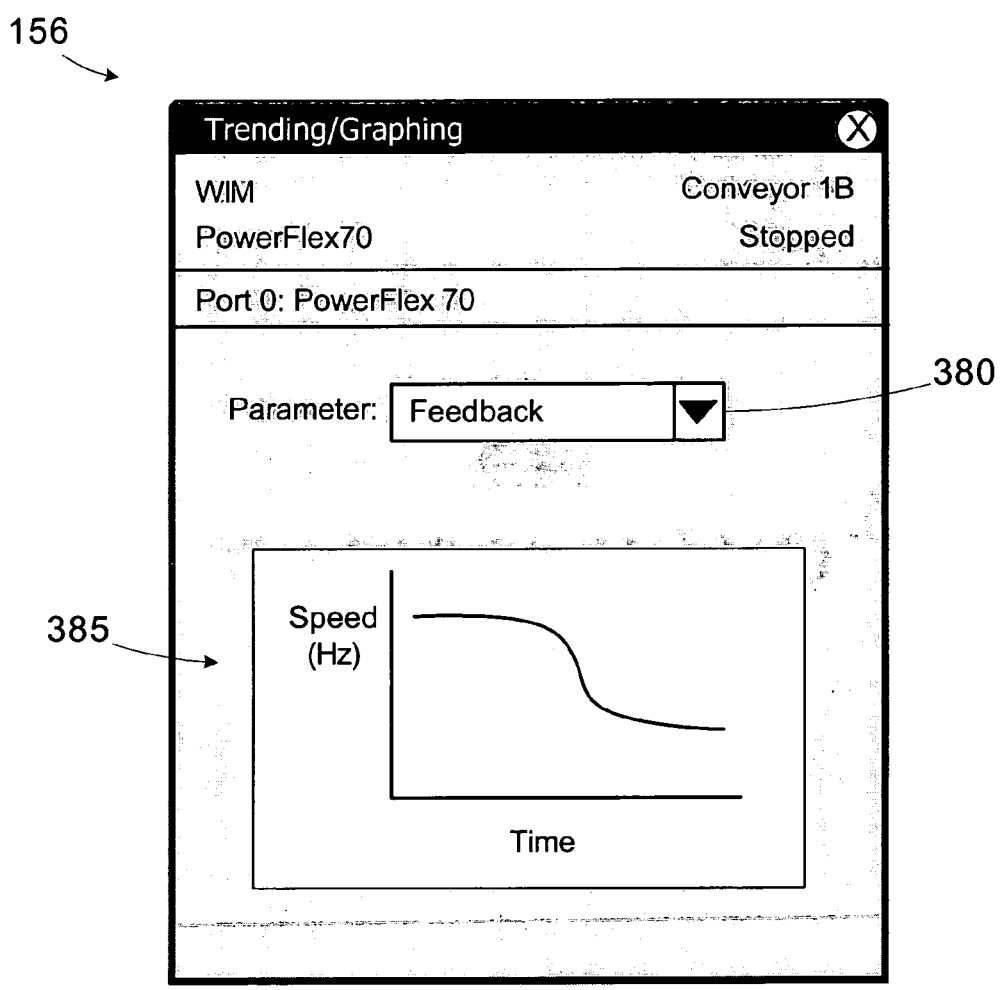

FIG. 12 shows an exemplary view of the trending/graphing tool 156. The trending/graphing tool 156 includes a drop down list 380 that allows the user to select a parameter to be monitored and a graph 385 that allows the value of the monitored parameter to be tracked over time. The trending/graphing tool 156 may use other interfaces to allow the user to select the parameter, such as the linear parameter list or the file and group hierarchy described above. Of course, the trending/graphing tool 156 may perform other statistical monitoring functions than the simple time plot illustrated.

Figure 13:
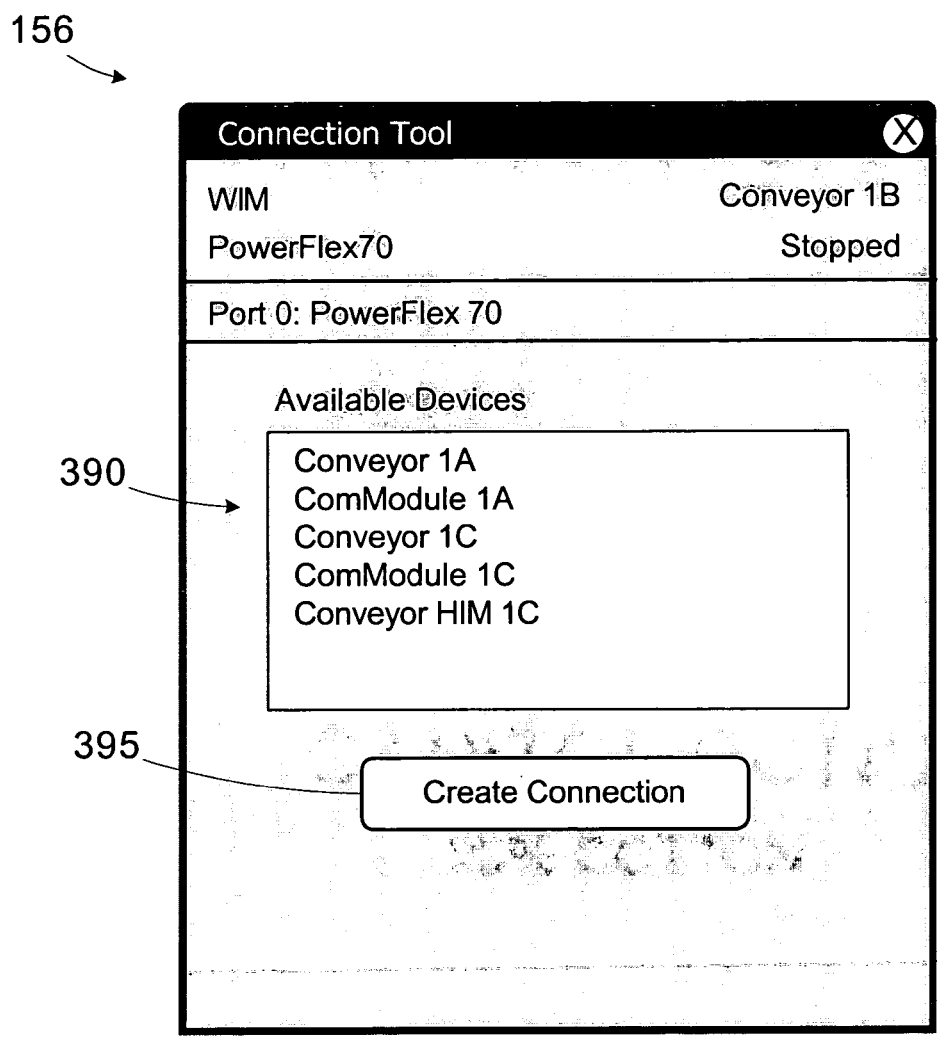

Turning now to FIG. 13, the connection tool 158 allows the user to create new connections to various entities within the industrial control system 10. If the connection tool 158 is not enabled, the user is limited to the pre-existing connections that have already been defined. The connection tool 158 displays a list 390 of available devices and a create connection button 395. The user selects a particular device and selects the connection button 395. The connection tool 158 subsequently stores a connection to the selected device including the network path to the device. Instead of the device list 390, the user may establish a connection with the wireless interface module 65 and then manually enter an IP address of a device in the industrial control system 10 to which a connection is to be made.

Returning to FIGS. 2 and 5, the programming terminal 20 may serve as a repository for all of the available software applications 142-154, flash updates, configuration files, etc. for the various devices within the industrial control system 10. An individual responsible for configuring the wireless user interface 70 for particular user may select the appropriate items to be loaded on the wireless user interface 70. The user may use the configuration tool 225 to select a particular suite of software applications 142-158 for use by the user as defined by the configuration mask 235. The wireless user interface 70 may then restrict access to those applications 142-158 that are not enabled by referencing the configuration mask 235. For example, the wireless user interface 70 may be configured as an upload/down load tool that does not allow editing of any parameters by the user. The reach of the wireless user interface 70 may be limited by disabling the connection tool 158, thereby limiting the user to the previously stored connections. The wireless user interface 70 may be used as a flash tool by enabling the flash update tool 152 and disabling the other applications. The wireless user interface 70 may be configured as a mobile human machine interface by enabling the control interface 154.

Because the wireless interface module 65 provides a wireless interface for accessing, modifying, or controlling entities within the industrial control system 10, security measures may be taken to prevent unauthorized users from gaining access. A first level of protection may be provided by configuring the wireless interface module 65 to require a password before allowing any device such as the wireless user interface 70, to establish a connection. Within the context of a Bluetooth® implementation, and as illustrated in FIGS. 1 and 2, the wireless interface module 65 may require the user of the wireless user interface 70 to enter a personal identification number (PIN) 400, which is a numeric password, typically 4 digits in length. Hence, the user would need to know the pin for a particular wireless interface module 65 prior to being allowed access to the industrial control system 10.

A second level of protection may be provided by configuring entities in the industrial control system 10 to require a password 405 prior to allowing access by any device requesting access. In FIG. 1, the motor drives 30, 35 are configured to require passwords. Although not illustrated, other entities, such as the I/O modules 40, 45 may also be configured to require passwords. In one embodiment, one parameter maintained by the drive may be a password flag which is set to "0"—"unlocked" if no password is required and set to "1"—"locked" if a password is required. A second parameter is the password itself. The password required flag may be provided by the motor drive 35, or other password enabled device in the industrial control system 10, during the connection process. The software of the wireless user interface 70 recognizes the password requirement based on the password flag and prompts the user for the password. Only if the wireless user interface 70 provides the motor drive 35 with the correct password does the motor drive 35 allow the connection. If an unauthorized user was able to get through the first level of security provided by the PIN 400 on the wireless interface module 65, the password 405 would prevent access to those devices on industrial control system 10 deemed sensitive and protected by a password 405. If a wireless user interface not configured to recognize the password requirement were to attempt connecting to the motor drive 35 having the password flag set, the connection would be refused. The dual-layer password scheme described here increases the robustness of the security provided to the industrial control system 10.

Another feature of the wireless interface module 65 and wireless user interface 70 that increases the robustness of the security is that the wireless interface module 65 is configured to extract messages from the wireless user interface 70 that are formatted using a proprietary message protocol. The Bluetooth®, or other wireless protocol, connection only provides the network and transport protocol for the proprietary message. If an unauthorized device were to connect to the wireless interface module 65 by compromising the PIN 400, it still would be unable to connect to the motor drive 35 or any other entity in the industrial control system 10, even those not protected by a password 405, because it would be unable to format messages using the proprietary message protocol (e.g., DPI™ or DSI™).

The wireless user interface 70 of the present invention enhances the industrial control system 10 by allowing wireless access without compromising reliability or security. Moreover, the wireless user interface 70 is flexible and may be configured to tailor the user's access to those functionalities appropriate for the tasks the user needs to complete.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. An industrial control system, comprising:
a motor drive having at least a first port;
a wireless interface module coupled to the first port of the motor drive; and
a wireless user interface comprising a display;
wherein the wireless user interface is configured to communicate with the wireless interface module and establish a first connection through the wireless interface module to access the motor drive, the wireless user interface being further configured to store a plurality of software applications for interfacing with the motor drive, store a configuration mask including access rights for at least a subset of the software applications, disable selected software applications based on the configuration mask, and display a host frame and a device frame, the host frame configured to display host data and the device frame configured to display device data, the device frame also configured to display an image of the motor drive on the display responsive to establishing the first connection;
wherein one of the plurality of software applications comprises a status monitor.

2. The system of claim 1, further comprising a programming terminal configured to interface with the wireless user interface, generate the configuration mask, and store the configuration mask on the wireless user interface.

3. The system of claim 2, wherein the programming terminal is configured to delete the disabled software applications from the wireless user interface.

4. The system of claim 2, wherein the programming terminal is configured to determine the access rights in the configuration mask based on an intended user of the wireless user interface.

5. The system of claim 1, wherein the subset of software applications comprise at least one of a parameter list viewer, a file and group viewer, an upload/download tool, a device properties viewer, a flash update tool, a control interface, a trending/graphing tool, and a connection tool.

6. The system of claim 1, wherein the motor drive has a particular drive type, and the image comprises an image corresponding to the drive type.

7. The system of claim 1, wherein the wireless user interface is configured to display identification data associated with the motor drive on the display.

8. The system of claim 1, wherein the wireless user interface is configured to display status information associated with the motor drive on the display.

9. The system of claim 1, further comprising a communication module coupled to an additional port of the motor drive, the wireless user interface configured to access a remote device coupled to a communication network through the wireless interface module and the communication module.

10. The system of claim 1, wherein the host frame configured to display host data is adapted to display a host name, a host type, a host state, and a port designation; and
the device frame configured to display device data is adapted to display a device name, a device type, a device rating, and a feedback designation.

11. The system of claim 10, wherein the device rating comprises at least one of a voltage and a current rating, and the feedback designation comprises a drive speed in Hertz.

12. A user interface configured to communicate with a device within an industrial control system, comprising:
a display;
a memory configured to store a plurality of software applications for interfacing with the device and a configuration mask including access rights for at least a subset of the software applications; and
a processing unit configured to establish a first connection with the device and disable selected software applications based on the configuration mask, the processing unit further configured to display a host frame and a device frame, the host frame configured to display host data and the device frame configured to display device data, the device frame also configured to display an image of the device on the display responsive to establishing the first connection;

wherein one of the plurality of software applications comprises a status monitor.

13. The interface of claim 12, wherein access rights in the configuration mask are configured based on an intended user of the user interface.

14. The interface of claim 12, wherein the subset of software applications comprise at least one of a parameter list viewer, a file and group viewer, an upload/download tool, a device properties viewer, a flash update tool, a control interface, a trending/graphing tool, and a connection tool.

15. The interface of claim 12, wherein the device has a particular device type, and the image comprises an image corresponding to the device type.

16. The interface of claim 12, wherein the processing unit is configured to display identification data associated with the device on the display.

17. The interface of claim 12, wherein the processing unit is configured to display status information associated with the device on the display.

18. An industrial control system, comprising:
a motor drive having at least a first and second port;
a wireless interface module coupled to the first port of the motor drive;
a communication module coupled to the second port of the motor drive; and
a wireless user interface;
wherein the wireless user interface is configured to communicate with the wireless interface module and establish a first connection through the wireless interface module to access the motor drive, the wireless user interface being further configured to route messages through the wireless interface module and through the communication module to access a remote device on a communication network, the wireless user interface being further configured to store a plurality of software applications for interfacing with the motor drive and the remote device, store a configuration mask including access rights for at least a subset of the software applications, and disable selected software applications based on the configuration mask;
wherein one of the plurality of software applications comprises a status monitor.

\* \* \* \* \*